United States Patent
Kramer (10) Patent No.: US 6,788,007 B2
(45) Date of Patent: Sep. 7, 2004

(54) USE OF ARC STRAIGHTENING IN HID LAMPS OPERATED AT VHF FREQUENCIES

(75) Inventor: Jerry Martin Kramer, Yorktown Height, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 6 days.

(21) Appl. No.: 10/023,695

(22) Filed: Dec. 21, 2001

(65) Prior Publication Data

US 2003/0117086 A1 Jun. 26, 2003

(51) Int. Cl.[7] .................................................. H05B 41/16
(52) U.S. Cl. ................................. 315/246; 315/209 R
(58) Field of Search ........................... 315/246, 209 R, 315/287, 326; 313/637, 638, 639, 640, 641, 642

(56) References Cited

U.S. PATENT DOCUMENTS

| | | | | |
|---|---|---|---|---|
| 5,684,367 A | * | 11/1997 | Moskowitz et al. | 315/246 |
| 5,880,561 A | * | 3/1999 | Miyazaki et al. | 315/209 R |
| 6,124,683 A | * | 9/2000 | Olsen et al. | 315/291 |
| 6,147,461 A | * | 11/2000 | Kominami et al. | 315/291 |
| 6,184,633 B1 | | 2/2001 | Kramer | 315/246 |
| 6,300,729 B1 | | 10/2001 | Keijser et al. | 315/326 |
| 6,437,517 B1 | * | 8/2002 | Kramer | 315/246 |
| 6,498,441 B1 | * | 12/2002 | Shen | 315/291 |

FOREIGN PATENT DOCUMENTS

| | | | |
|---|---|---|---|
| EP | 0785702 | 7/1997 | ........... H05B/41/29 |
| EP | 825808 | 2/1998 | ........... H05B/41/29 |
| EP | 1 058 288 | 12/2000 | |
| WO | WO 00/45419 | 8/2000 | |
| WO | WO0230162 | 4/2002 | ......... H05B/41/292 |

* cited by examiner

Primary Examiner—James Vannucci (57) ABSTRACT

A method and device for arc straightening in an HID lamp, the method comprising the steps of: determining and selecting a frequency signal or a frequency sweep signal that produces arc straightening for an HID lamp; and exciting an arc straightening acoustic mode in conjunction with a carrier frequency signal. In a preferred embodiment, the exciting step comprises amplitude modulating the carrier frequency signal with either the frequency signal or the frequency sweep signal which corresponds to the power frequencies for arc straightening. In a further embodiment, the exciting step comprises summing the carrier frequency signal with a second frequency signal or second frequency sweep signal to obtain a difference power frequency or power frequencies which excite an arc straightening acoustic mode.

8 Claims, 6 Drawing Sheets

USE OF ARC STRAIGHTENING IN HID LAMPS OPERATED AT VHF FREQUENCIES

FIELD OF THE INVENTION

The present invention relates generally to the field of high intensity discharge lamps, and more particularly to the field of arc straightening for such lamps.

BACKGROUND OF THE INVENTION

HID lamps operated at high frequency are susceptible to acoustic resonances. Standing pressure waves in the lamp can cause the arc to become distorted, to move the arc from side to side, creating an annoying flicker, or even in severe cases to destroy the lamp. One solution to this problem is to operate at a high enough frequency (VHF), such that the acoustic resonances are sufficiently damped to keep the arc stable. Considerations that can impose an upper limit on the VHF frequency include EMI and the switching times of a typical bridge circuit.

It is difficult to guarantee that all lamps designed for a specific ballast will be resonant free at a particular VHF frequency. Two lamps, similarly identical in construction, may have weak instabilities at different frequencies. Lamps of a given wattage may have different chemical fills to provide light with different color temperature. This difference in chemistry may affect the arc stability at VHF frequencies. Differences in how the lamp electrodes function at VHF frequencies may also play a role in the arc stability. One simple approach to avoid weak acoustic resonances at VHF frequencies is to utilize a frequency sweep. However this technique is frequently unsuccessful.

Figure 1:
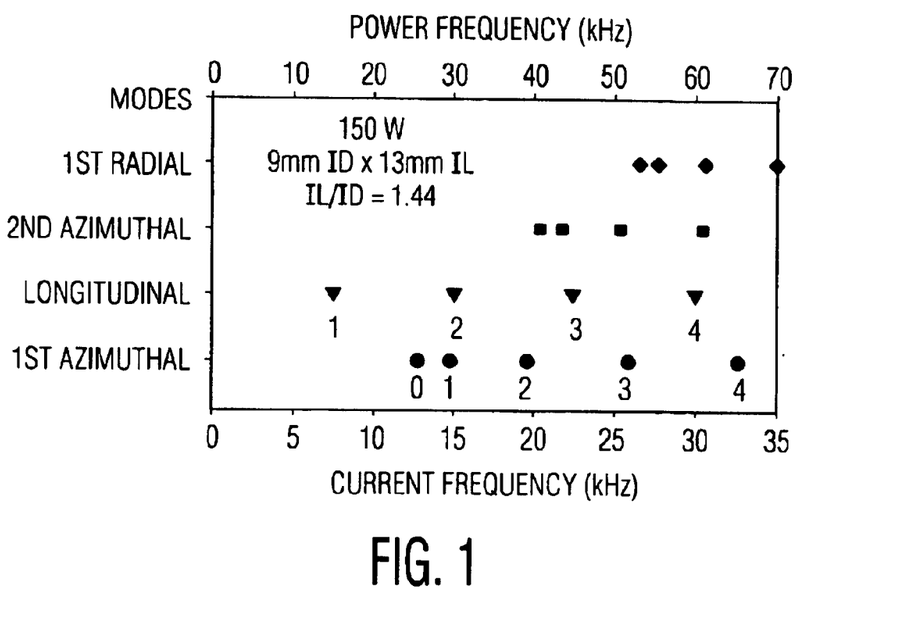
FIG. 1 is resonance chart of an HID lamp with an IL/ID of 1.44.

Certain acoustic resonances can be used also in a beneficial way. When a horizontally operated lamp is excited at specific frequencies the arc, which is normally bowed up by convection, becomes straight between the electrodes. This phenomenon is called arc straightening. Frequencies that produce arc straightening are frequently found above the $1^{st}$ azimuthal acoustic mode of the lamp and below the $1^{st}$ radial acoustic mode of the lamp. Between these two purely radial acoustic modes are the $2^{nd}$ azimuthal acoustic mode (purely radial, but relatively weak) and the longitudinal combination acoustic modes associated with these azimuthal acoustic modes. The number of combination acoustic modes depends on the aspect ratio of the lamp. For lamps with low aspect ratio (IL/ID<~2) the spacing between the acoustic modes can be sufficient for discrete frequencies to produce arc straightening. This is illustrated in FIG. 1 for a cylindrical 150 W ceramic metal halide lamp with dimensions of 9 mm ID×13 mm IL (aspect ratio=1.44). FIG. 1 shows the current and power frequencies associated with the acoustic resonances up to the first few combination acoustic modes of the $1^{st}$ radial acoustic mode. (The numbers under the acoustic modes refer to the longitudinal acoustic mode number for the pure longitudinal acoustic modes and to the longitudinal acoustic mode number of the $1^{st}$ azimuthal/longitudinal combination acoustic modes. The numbering system is the same for the $2^{nd}$ azimuthal and $1^{st}$ radial acoustic modes.) From FIG. 1 one can see that there is a small range or window of frequencies, between resonances, from approximately 15 to 20 kHz current frequency that could produce arc straightening. Note that acoustic resonances are driven by a periodic power input. For sinusoidal type waveforms, the power frequency that excites an acoustic resonance is at twice the current (or voltage) frequency.

Figure 2:
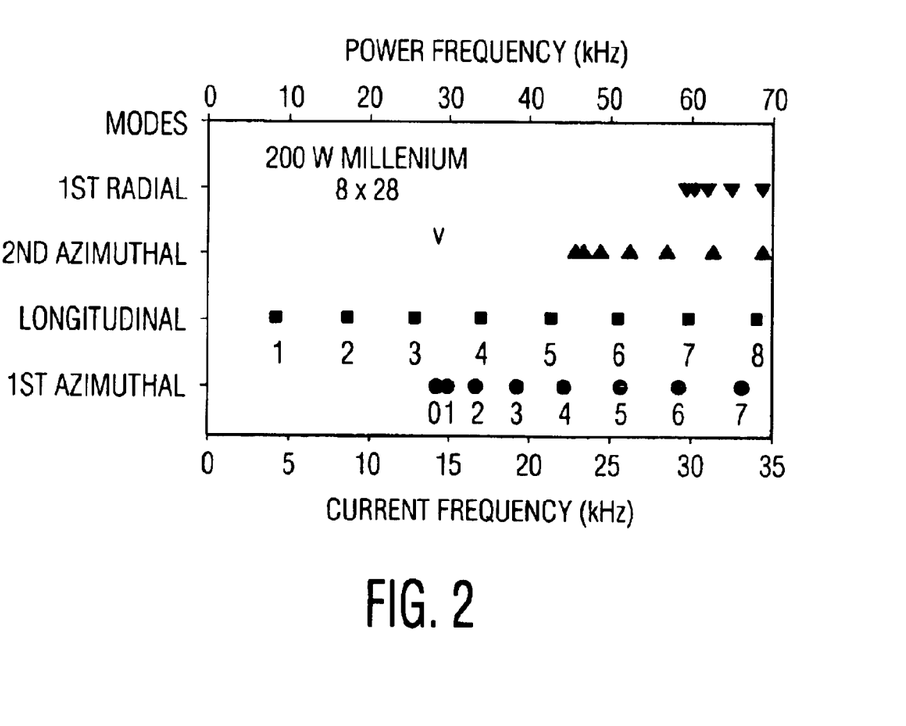
FIG. 2 is a resonance chart of an HID lamp with an IL/ID of 3.50.

For long and thin lamps with higher aspect ratio (IL/ID>~3) the spacing of the combination acoustic modes is much closer and no resonant free windows for arc straightening are apparent. This is illustrated in FIG. 2 for a cylindrical 200 W ceramic metal halide lamp with dimensions of 8 mm ID and 28 mm IL (aspect ratio 3.50). For lamps with higher aspect ratio a frequency sweep over about a 5 or 10 kHz range above the $1_{st}$ azimuthal acoustic mode and below the $1^{st}$ radial acoustic mode with a period of about 10 ms can produce arc straightening. For the lamp shown in FIG. 2 the frequency sweep is from about 20 to 25 kHz current frequency.

A second example of a beneficial acoustic resonance comes from excitation of the $2^{nd}$ longitudinal acoustic mode. By exciting this acoustic mode one can move some of the metal halide chemistry that is segregated near the bottom of a vertically burning lamp higher up into the discharge. This effect can change the color temperature in a vertically burning lamp or increase the lamp efficacy. This effect has been called color mixing. See U.S. Pat. No. 6.184,633.

Utilizing arc straightening with a VHF carrier overcomes potential problems that can occur when a lamp is operated only at VHF. But VHF carrier frequencies may cause weak discharge instabilities, whether caused by acoustic resonances or instabilities at the electrodes. Arc straightening can stabilize the discharge, increasing the range of potential VHF carrier frequencies. The increased freedom to choose a VHF carrier frequency can have advantages in circuit efficiency or in the ability to meet EMI regulations. Especially for long and thin burners operated in horizontal orientation, arc straightening at VHF frequencies can keep the discharge away from the upper wall and prevent cracking of the arc tube.

SUMMARY OF THE INVENTION

Briefly, the present invention comprises, in a first embodiment, a method for arc straightening in an HID lamp, comprising the steps of: determining and selecting a frequency signal or a frequency sweep signal that produces arc straightening for an HID lamp; and exciting an arc straightening acoustic mode in conjunction with a carrier frequency signal.

In a further aspect of this embodiment, the step is provided of choosing the carrier frequency signal sufficiently high so that in conjunction with the frequency signal or the frequency sweep signal the arc is stable.

In a further aspect of this embodiment, the exciting step comprises amplitude modulating the carrier frequency signal with either the frequency signal or the frequency sweep signal which corresponds to the power frequencies for arc straightening.

In a further aspect of this embodiment, the step is provided of controlling the amount of arc straightening by controlling an amplitude of the amplitude modulating frequency signal or an amplitude of the modulating frequency sweep signal.

In a further aspect of this embodiment, the exciting step comprises summing the carrier frequency signal with a second frequency signal or second frequency sweep signal to obtain a difference power frequency or power frequencies which excite an arc straightening acoustic mode.

In a further aspect of this embodiment, the step is provided of controlling an amount of arc straightening by controlling an amplitude of the second frequency signal or the second frequency sweep signal relative to the amplitude of the carrier frequency signal.

In a further aspect of this embodiment, the exciting step comprises the step of alternating in time continuously the carrier frequency signal and either a frequency signal or a frequency sweep signal where the frequency signal or frequency sweep signal is equal to one half the power frequency required for producing arc straightening for an HID lamp.

In a further aspect of this embodiment, the step is provided of controlling an amount of arc straightening by controlling a duration of the frequency signal or the frequency sweep signal relative to a duration of the carrier frequency signal.

In a further aspect of this embodiment, the determining step comprises: determining a resonance spectrum for the HID lamp; if a window is present in the resonance spectrum that is above the first azimuthal acoustic mode for the HID lamp and below the first radial acoustic mode for the HID lamp, then selecting a frequency signal that produces arc straightening from within the window; and if the window is not present, then selecting a frequency range for the frequency sweep signal that produces arc straightening that is above the first azimuthal acoustic mode for the HID lamp and below the first radial acoustic mode for the HID lamp.

In a further aspect of this embodiment, the HID lamp has a cylindrical symmetry.

In a further aspect of this embodiment, the HID lamp has a discharge vessel with a ceramic envelope.

In a further aspect of this embodiment, the step of selecting a frequency for producing arc straightening comprises selecting a frequency between a first azimuthal acoustic mode and a first radial acoustic mode in the resonance spectrum for the HID lamp which not only produces arc straightening but also excites the second longitudinal acoustic mode in order to obtain color mixing.

In a further embodiment of the present invention, an HID lamp is provided with arc straightening, comprising: a discharge vessel (3) containing an ionizable filling; and a circuit (300, 302, 304, 306, 308) for exciting an arc straightening acoustic mode in conjunction with a carrier frequency in the discharge vessel.

In a further aspect of this embodiment, the circuit for exciting the discharge vessel includes a component for summing the carrier frequency signal with a second frequency signal or a frequency sweep signal to obtain a difference power frequency signal which excites the arc straightening acoustic mode.

In a further aspect of this embodiment, the circuit for exciting the discharge vessel alternates in time continuously the carrier frequency signal and either a frequency signal or a frequency sweep signal where the frequency signal or frequency sweep signal is equal to one half the power frequency required for producing arc straightening for the HID lamp.

In a further aspect of this embodiment, the circuit for exciting an arc straightening acoustic mode in conjunction with a carrier frequency in the discharge vessel uses a frequency between a first azimuthal acoustic mode and a first radial acoustic mode in the resonance spectrum for the HID lamp which also excites the second longitudinal acoustic mode in order to obtain color mixing.

DETAILED DESCRIPTION OF THE PREFERRED EMBODIMENTS

Figure 3A:
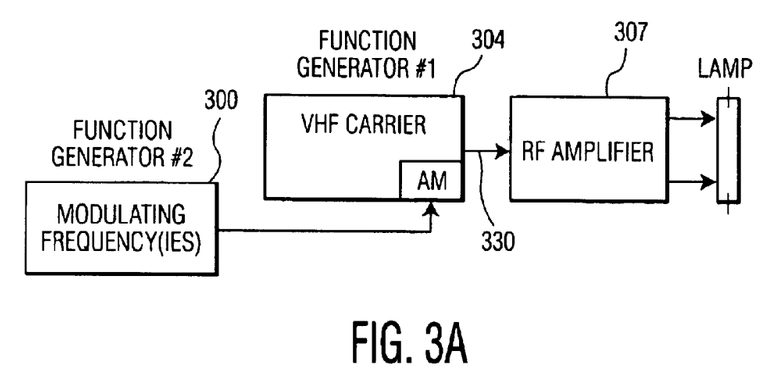
FIG. 3A is a schematic block diagram of one embodiment of the frequency generation for the present invention.
Figure 3B:
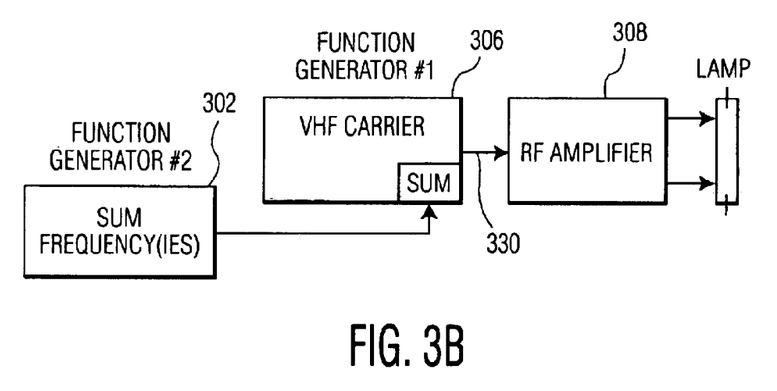
FIG. 3B is a schematic block diagram of a second embodiment of the frequency generation for the present invention.

Arc straightening is disclosed for use with ceramic metal halide HID lamps at VHF carrier frequencies to stabilize the lamps. More specifically, a method is provided for arc straightening in an HID lamp, comprising the steps of determining and selecting a frequency or a frequency sweep that produces arc straightening for an HID lamp; and exciting an arc straightening acoustic mode in conjunction with a carrier frequency. The provision of the frequency or the frequency sweep Δf for arc straightening in conjunction with the carrier frequency is shown in FIGS. 3A and 3B. In FIG. 3A and FIG. 3B, function generators 300 and 302 generate the frequency and/or the frequency sweep, which is then provided to respective function generators 304 and 306 which provide the carrier frequency. The function generators 304 and 306 perform a mathematical operation on the incoming frequencies and provide an output on line 330 to an RF amplifier 308 for application to the electrodes of an HID lamp. The mathematical operation can take a variety of forms. In a preferred embodiment shown in FIG. 3A, the carrier frequency is amplitude modulated with the frequency or the frequency sweep. In an alternative embodiment shown in FIG. 3B, the mathematical operation may comprise determining a sum of the carrier frequency and a second frequency or frequency sweep and using the difference power frequency as the frequency or frequency sweep for arc straightening. Alternatively, the mathematical operation could comprise alternating in time continuously the carrier frequency and the second frequency or the second frequency sweep. In this embodiment, the second frequency or second frequency sweep is equal to one half the power frequency required for arc straightening.

Note that in horizontal orientation arc straightening is apparent from the position of the discharge with respect to the axis defined by the electrodes. The discharge, normally bowed up by convection, is displaced downward by arc straightening such that the discharge lies along the axis defined by the electrodes. This displacement can be seen in a projection of the lamp and/or by a reduction in the lamp voltage. In vertical orientation arc straightening will be apparent if the discharge is unstable without arc straightening. Arc straightening will eliminate instabilities that are visible as an annoying flicker and that produce a temporal variation in the lamp voltage due to the arc motion.

It should be noted that the important aspects of the present invention relate to the way the different frequency signals are combined. The specific hardware illustrated in the drawings is for ease of explanation only. A variety of other methods for combining the frequency signals would be evident to one of ordinary skill in the art. Thus, the invention is in no way limited to one particular hardware configuration.

Figure 4:
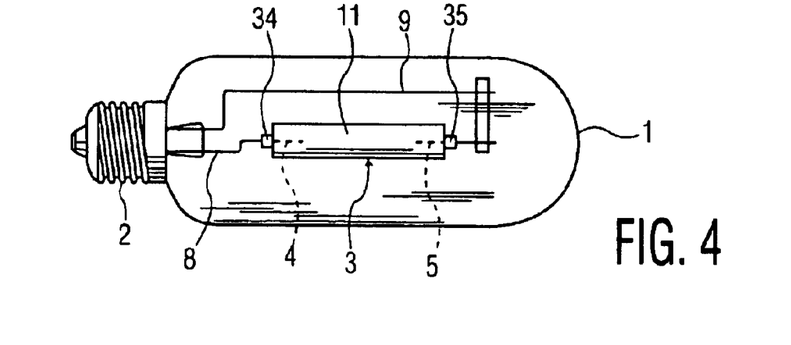
FIG. 4 is a schematic diagram of an HID lamp that may be used to implement an embodiment of the present invention.
Figure 5:
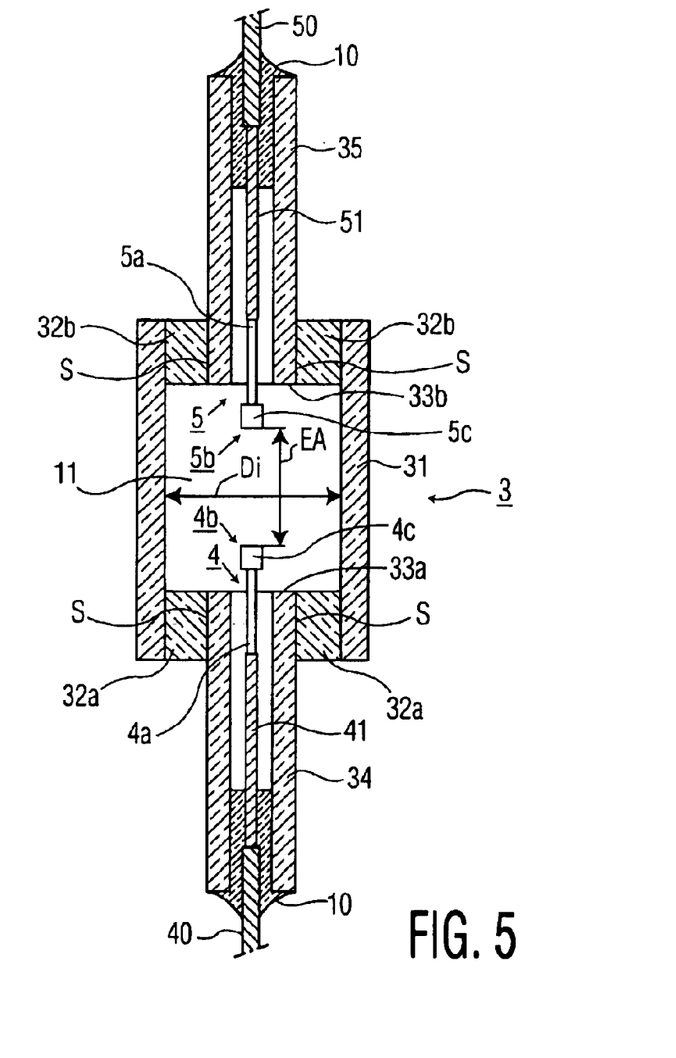
FIG. 5 is a cross-section of a discharge vessel of the lamp shown in FIG. 4.

Before going into more detail on the exciting of an arc straightening acoustic mode in conjunction with a carrier frequency, details will be provided for one embodiment of an HID lamp that may be implemented with the present invention. Referring now to FIG. 4, a metal halide lamp is shown comprising a discharge vessel 3, with details of the discharge vessel 3 shown in a cross-section and not to scale in FIG. 5. The discharge vessel 3 is shown to include a ceramic wall enclosing a discharge space 11 which contains an ionizable filling in the lamp. In a preferred embodiment, the ionizable filling includes Hg and a quantity of metal halide chemistries. The metal halide chemistry typically includes one or more of Na halides, Tl, Dy and Ce halides. Two electrodes 4, 5 with electrode bars 4a, 5a and tips 4b, 5b are arranged in the discharge space with a distance EA therebetween, in the drawing. The discharge vessel has an internal diameter Di at least through the distance EA. The discharge vessel is sealed at the ends by a ceramic projecting plug 34, 35 which tightly encloses a current feedthrough conductor 40, 41 and 50, 51 which connect to the electrodes 4, 5 arranged in the discharge vessel in a gastight manner by means of a melt-ceramic compound 10 near one end remote from the discharge space. The discharge vessel 3 is enclosed by an outer envelope 1 provided at one end with a lamp cap 2. In the operational state of the lamp, a discharge extends between the electrodes 4, 5. Electrode 4 is connected via a current conductor 8 to a first electric contact which forms part of the lamp cap 2. Electrode 5 is connected via a current conductor 9 to a second electric contact which forms part of the lamp cap 2. The metal halide lamp shown is intended to be operated with an electronic ballast, as described in more detail in U.S. Pat. No. 6,300,729, which is hereby incorporated by reference, or a magnetic ballast, or other convenient ballast. Note that the above-described configuration for the HID lamp is provided for purposes of explaining the invention, but that the invention is in no way limited to this configuration.

Note that the chemistries for the ionizable filling may be implemented in a variety of formulations. The present invention is not limited the formulations disclosed in the examples.

Figure 6A:
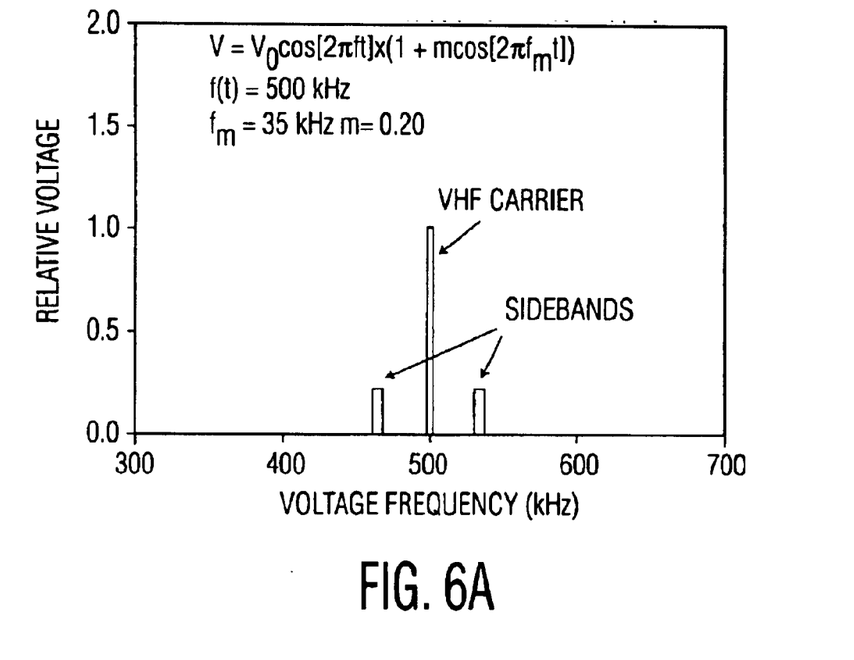
FIG. 6A is a graph of relative voltage v. voltage frequency for amplitude modulation with a single frequency.
Figure 6B:
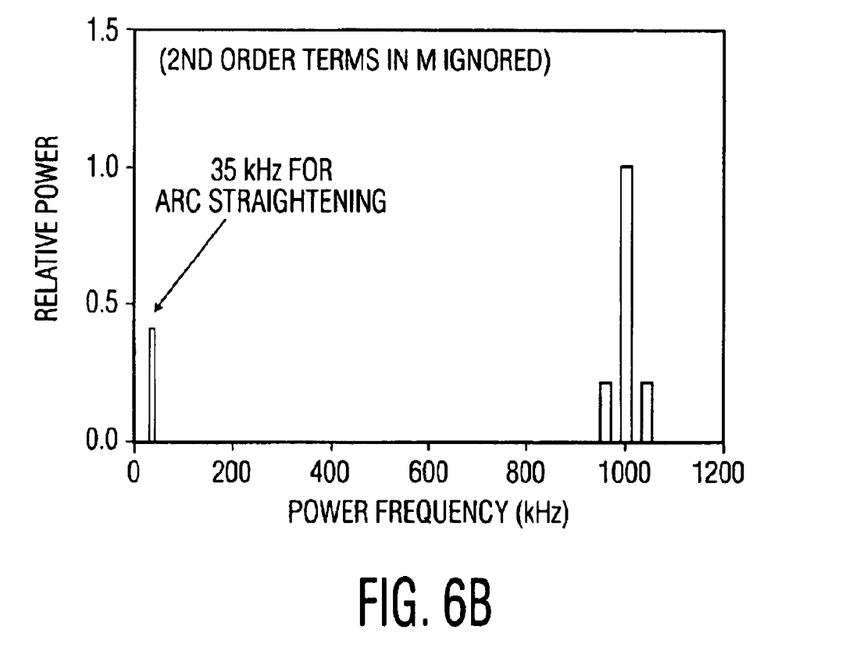
FIG. 6B is a graph of the relative power v. power frequency for amplitude modulation with a single frequency.
Figure 7A:
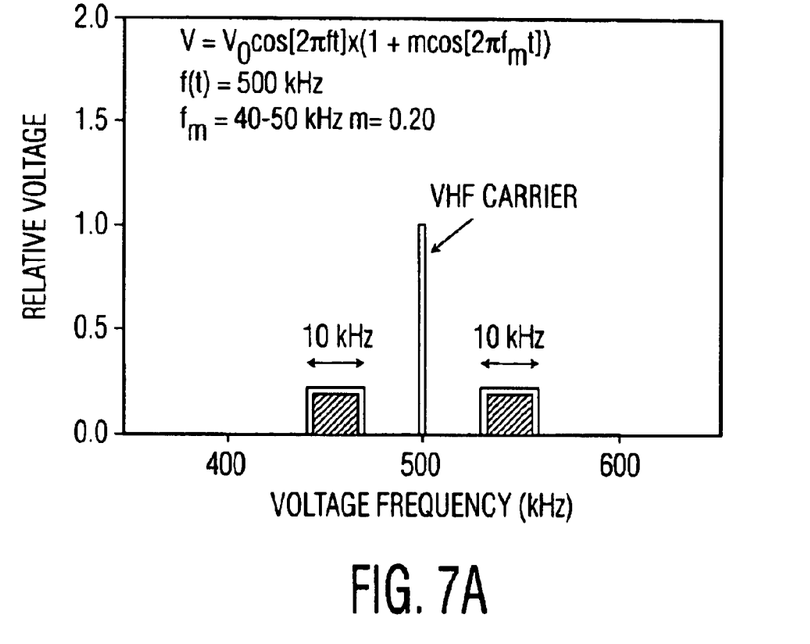
FIG. 7A is a graph of relative voltage v. voltage frequency for amplitude modulation with a frequency sweep.
Figure 7B:
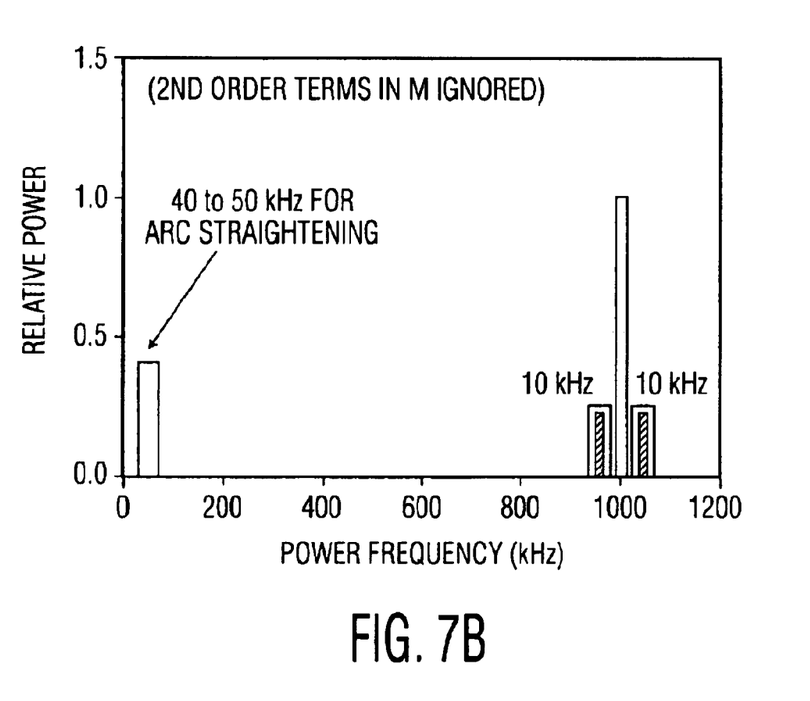
FIG. 7B is a graph of the relative power v. power frequency for amplitude modulation with a frequency sweep.

Referring again to FIG. 3 and the operation of exciting an arc straightening acoustic mode in conjunction with a carrier frequency, in a preferred embodiment arc straightening was accomplished by amplitude modulating the VHF carrier frequency. The VHF carrier frequency is chosen to be sufficiently high so that in conjunction with the arc straightening frequency or the arc straightening frequency sweep the arc is stable. This is typically determined empirically. As noted above, in FIG. 3A the frequency or the frequency sweep that produces arc straightening is generated in the function generator 300. This frequency or frequency sweep is provided so as to amplitude modulate the function generator 304 which generates the carrier frequency. The resulting amplitude modulated voltage (or current) waveform is of the form $\cos(2\pi f_1 t)*[1+m_2 \cos(2\pi f_2 t)]$ where $f_1$ is the VHF carrier frequency, $f_2$ is the amplitude modulating frequency and $m_2$ is the modulation index (<1). The frequency spectrum for the voltage after such an amplitude modulation with a single frequency for arc straightening is shown in FIG. 6A. The power spectrum for such an amplitude modulation (due to the squared components because the voltage and current components have the same frequency relationship) has frequency components at $2f_1$, $f_2$, $2f_1-f_2$, and $2f_1+f_2$ plus $2^{nd}$ order terms. The power spectrum for the voltage frequency spectrum of FIG. 6A is shown in FIG. 6B for the amplitude modulation with a single frequency. It can be seen that the 35 kHz power frequency will excite that necessary resonance within the resonance chart window for the HID lamp to obtain arc straightening. Likewise, the frequency spectrum for the voltage after an amplitude modulation with a frequency sweep of 40–50 kHz for arc straightening is shown in FIG. 7A. The power spectrum for such an amplitude modulation due to the squared components is shown in FIG. 7B. It can be seen that the 40–50 kHz power frequency sweep will excite that necessary resonance for HID lamps that do not have a window because their acoustic resonances are bunched together in the resonance chart, in order to obtain arc straightening.

With this setup, a vertical 150 W ceramic metal halide discharge lamp with dimensions of 9 mm ID×13 mm IL and a 3000 K color temperature was stable at VHF frequencies from about 600 kHz down to about 450 kHz. Below 450 kHz discrete frequencies caused the arc to flutter. Amplitude modulation of the carrier frequency in the middle 30's kHz and middle 40's kHz range (corresponding to current frequencies in the middle teens and middle 20's kHz) stabilized the arc at unstable carrier frequencies. Note that these frequencies are between the $1^{st}$ azimuthal and $1^{st}$ radial acoustic modes (see FIG. 1). Note that by amplitude modulating the VHF carrier frequency, the frequency window for stabilizing the lamp is twice as large as the corresponding current frequency range.

In one test, a vertical 150 W ceramic metal halide discharge lamp with dimensions of 9 mm ID×13 mm IL and a 4000 K color temperature was unstable over a wide range of VHF frequencies (at least 425 to 600 kHz). This 4000 K color temperature lamp has the same dimensions as the 3000 K lamp described above, but different chemistry and different electrode insertion distance (distance from the inner flat surface of the ceramic body to the electrode tip). The arc swayed back and forth in a very regular manner. It was possible to stop the arc motion by amplitude modulating the carrier frequency with a frequency in the middle 30's kHz range, similar to the 3000 K lamp described above.

In another test, a 200 W ceramic metal halide discharge lamp with dimensions of 8 mm ID×28 mm IL was operated at VHF in a vertical base up orientation. In the range from about 370 to 500 kHz many weak acoustic resonances were observed. Most of the instabilities were observed at the bottom electrode. A number of frequencies that appeared stable initially developed instabilities after many seconds or even minutes. Amplitude modulation with a frequency sweep from 40 to 50 kHz (corresponding to current frequencies between 20 and 25 kHz and a modulation index, $m_2 \approx 0.2$, stabilized the lamp at VHF frequencies from 370 to 500 kHz. These frequencies are between the $1^{st}$ azimuthal and $1^{st}$ radial acoustic modes (see FIG. 2).

Movement of the condensate off the bottom of the arc tube (color mixing) was accomplished in both 150 W ceramic lamps described above (3000 and 4000 K). The lamps were operated at VHF frequencies and amplitude modulated at about 30 kHz, which excited the $2^{nd}$ longitudinal acoustic mode. As shown in FIG. 1, the $2^{nd}$ longitudinal acoustic mode lies higher in frequency than the 1st azimuthal acoustic mode and lower in frequency than the 1st radial acoustic mode. Thus excitation of the 2nd longitudinal acoustic mode should also produce arc straightening. This was demonstrated by operating the 4000 K 150 W lamp at a VHF frequency with arc motion back and forth. The VHF carrier was amplitude modulated at about 30 kHz which both stabilized the lamp with respect to arc motion as well as moved the condensate off the bottom of the arc tube.

The frequency of the 2nd longitudinal acoustic mode with respect to the 1st azimuthal and 1st azimuthal/longitudinal combination acoustic modes depends in part on the aspect ratio of the lamp. It is possible to change the frequency of the 2nd longitudinal acoustic mode with respect to these other acoustic modes by slightly changing the aspect ratio. It is also possible, knowing the dimensions of a lamp to predict what the frequencies of the various acoustic modes will be.

One can excite the 2nd longitudinal acoustic mode of a 200 W ceramic metal halide discharge lamp with dimensions of 8 mm ID×28 mm IL by amplitude modulating a VHF carrier frequency at 16 kHz. However, only a small amount of color mixing is possible before the arc shifts towards the wall near the bottom electrode. The inability to fully color mix the discharge is because the 2nd longitudinal acoustic mode frequency lies lower in frequency than the 1st azimuthal acoustic mode and arc straightening is not operative.

An alternative configuration for achieving arc straightening is shown in FIG. 3B. This configuration to obtain arc straightening with a VHF carrier is based on obtaining difference power frequencies. Referring to FIG. 3B, a function generator 302 generates a second frequency $f_2$ which is chosen in order to realize a desired arc straightening frequency or frequency sweep after summing with a VHF carrier frequency $f_1$ at the function generator 306. The summing operation in the function generator 306 results in the power frequencies $2f_1$, $2f_2$, $f_2-f_1$, and $f_2+f_1$. Arc straightening is possible if $f_2-f_1$ (or $f_1-f_2$) is equal to an effective arc straightening frequency (e.g. the middle 30's kHz for the 150 W lamps with dimensions of 9 mm ID×13 mm IL). Alternatively, if a window is not present in the resonance chart for the lamp, so that a frequency sweep is required for arc stabilization, then the frequency sweep $\Delta f_2$ is chosen as a frequency to be summed so that $\Delta f_2-f_1$ (or $f_1-\Delta f_2$) is equal to the power frequency sweep required for arc straightening (e.g. 40 to 50 kHz for the 200 W lamp with dimensions of 8 mm ID×28 mm IL). Note that adjusting the amplitude off $f_2$ or $\Delta f_2$ controls the amount of arc straightening.

Figure 8:
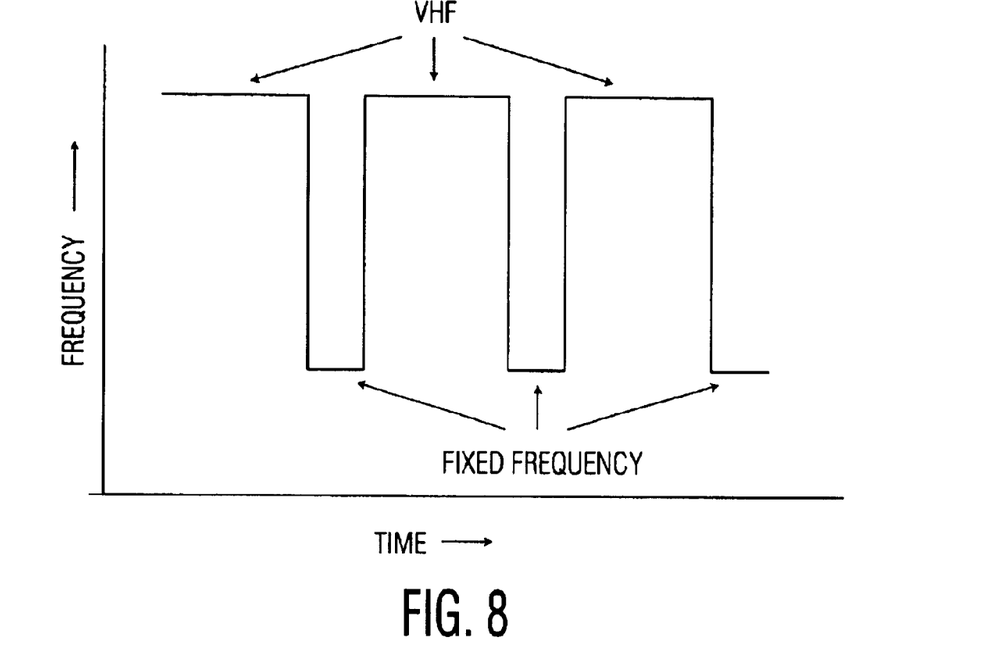
FIG. 8 is a frequency v. time graph of the carrier frequency alternating with a fixed frequency.
Figure 9:
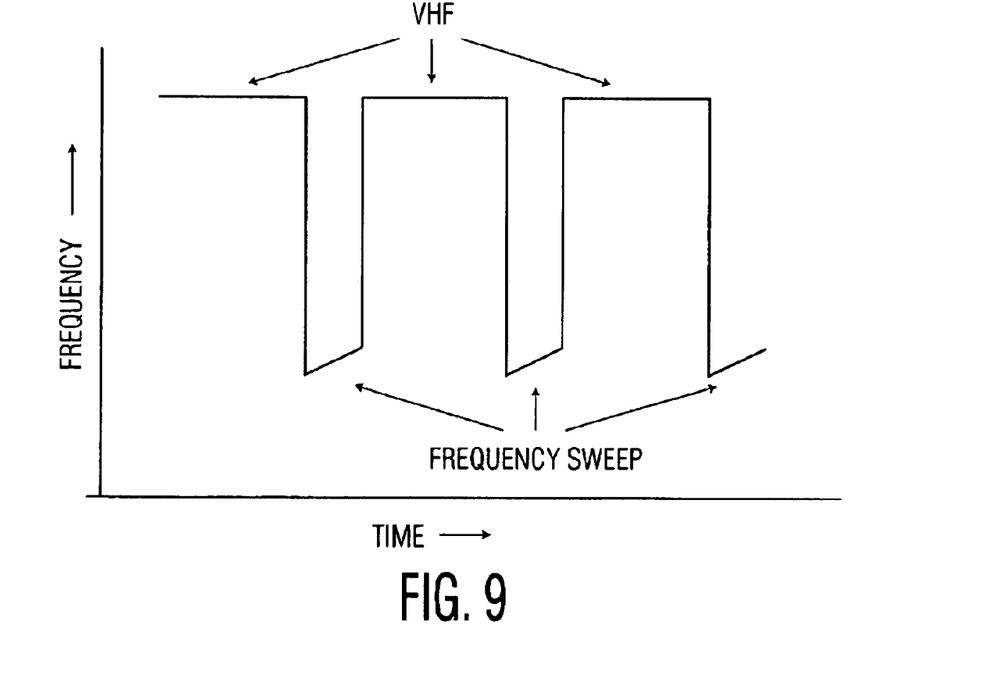
FIG. 9 is a frequency v. time graph of the carrier frequency alternating with a sweep frequency.

As a yet further alternative for exciting an arc straightening acoustic mode in conjunction with a carrier frequency, a time sequential frequency method may be used. In the time sequential method, two frequencies, which may be provided by a single or multiple function generators, are alternated in time continuously. The first frequency is the VHF carrier frequency, $f_1$ and the second frequency is either a fixed frequency $f_3$, or a frequency sweep, $\Delta f_3$. $f_3$ or $\Delta f_3$ is equal to one half of the power frequency required for arc straightening. FIG. 8 is a graph showing the waveform of a time sequence with the VHF carrier frequency alternated with a fixed frequency. FIG. 9 is a graph showing the waveform of a time sequence with the VHF carrier frequency alternated with a frequency sweep. The amount of arc straightening is controlled by the duration of $f_3$ or $\Delta f_3$ compared to the duration of $f_1$.

It should be noted that there are a variety of other methods available for performing the amplitude modulation, or summing or time sequencing, and that the present invention is not limited to the specific structure illustrated in the diagrams to perform these operations.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for arc straightening in an HID lamp, comprising the steps of:

determining and selecting a frequency signal or a frequency sweep signal that produces arc straightening for an HID lamp; and exciting an arc straightening acoustic mode in conjunction with a carrier frequency signal, wherein the exciting step comprises summing the carrier frequency signal with a second frequency signal or second frequency sweep signal to obtain a difference power frequency signal or power frequencies which excite an arc straightening acoustic mode.

2. The method as defined in claim 1, further comprising the step of controlling an amount of arc straightening by controlling an amplitude of the second frequency signal or the second frequency sweep signal relative to the amplitude of the carrier frequency signal.

3. A method for arc straightening in an HID lamp, comprising the steps of:

determining and selecting a frequency signal or a frequency sweep signal that produces arc straightening for an HID lamp; and exciting an arc straightening acoustic mode in conjunction with a VHF carrier frequency signal, said carrier frequency signal having a frequency higher than the frequency of said frequency signal or said frequency sweep signal, wherein the exciting step comprises the step of alternating in time continuously the carrier frequency signal and either said frequency signal or said frequency sweep signal where the frequency of the frequency signal or frequency sweep signal is equal to one half the frequency frequency signal required for producing arc straightening for an HID lamp.

4. The method as defined in claim 3, further comprising the step of controlling an amount of arc straightening by controlling a duration of the frequency signal or the frequency sweep signal relative to a duration of the carrier frequency signal.

5. A method for arc straightening in an HID lamp, comprising the steps of:

determining and selecting a frequency signal or a frequency sweep signal that produces arc straightening for an HID lamp; and exciting an arc straightening acoustic mode in conjunction with a carrier frequency signal, wherein the determining step comprises:

determining a resonance spectrum for the HID lamp;

if a window is present in the resonance spectrum that is above the first azimuthal acoustic mode for the HID lamp and below the first radial acoustic mode for the HID lamp, then selecting a frequency signal that produces arc straightening from within the window; and if the window is not present, then selecting a frequency range for the frequency sweep signal that produces arc straightening that is above the first azimuthal acoustic mode for the HID lamp and below the first radial acoustic mode for the HID lamp.

6. An HID lamp with arc straightening, comprising:

a discharge vessel containing an ionizable filling; and a circuit for producing a frequency signal or a frequency sweep signal for exciting an arc straightening acoustic mode in conjunction with a carrier frequency signal in the discharge vessel, wherein the circuit for exciting the discharge vessel includes a component for summing the carrier frequency signal with a second frequency signal or a frequency sweep signal to obtain a difference power frequency signal which excites the arc straightening acoustic mode.

7. An HID lamp with arc straightening, comprising:

a discharge vessel containing an ionizable filling; and a circuit for producing a frequency signal or a frequency sweep signal for exciting an arc straightening acoustic mode in conjunction with a VHF carrier frequency signal in the discharge vessel, said carrier frequency signal having a frequency higher than the frequency of said frequency signal or said frequency sweep signal, wherein the circuit for exciting the discharge vessel alternates in time continuously the carrier frequency signal and either said frequency signal or said frequency sweep signal where the frequency of the frequency signal or frequency sweep signal is equal to one half the power frequency signal required for producing arc straightening for the HID lamp.

8. An HID lamp with arc straightening, comprising:

a discharge vessel containing an ionizable filling, wherein said vessel has an aspect ratio arranged such that a second longitudinal acoustic mode in the resonance spectrum for the HID lamp is at a frequency between a first azimuthal acoustic mode and a first radial acoustic mode; and a circuit for producing a frequency signal or a frequency sweep signal for exciting an arc straightening acoustic mode in conjunction with a VHF carrier frequency signal in the discharge vessel, said carrier frequency signal having a frequency higher than the frequency of said frequency signal or said frequency sweep signal, wherein the circuit for exciting an arc straightening acoustic mode in conjunction with a carrier frequency signal in the discharge vessel uses a frequency between the first azimuthal acoustic mode and the first radial mode in the resonance spectrum for the HID lamp which also excites the second longitudinal acoustic mode in order to obtain color mixing.

* * * * *